United States Patent
Yamasaki et al.

(10) Patent No.: US 11,945,031 B2
(45) Date of Patent: Apr. 2, 2024

(54) LAMINATED MOLDED OBJECT PRODUCTION METHOD AND PRODUCTION DEVICE

(71) Applicant: KABUSHIKI KAISHA KOBE SEIKO SHO (KOBE STEEL, LTD.), Hyogo (JP)

(72) Inventors: Takemasa Yamasaki, Hyogo (JP); Tatsuya Fujii, Hyogo (JP); Shinji Sato, Hyogo (JP); Takeshi Yamada, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 717 days.

(21) Appl. No.: 15/733,967

(22) PCT Filed: May 31, 2019

(86) PCT No.: PCT/JP2019/021879
§ 371 (c)(1),
(2) Date: Dec. 1, 2020

(87) PCT Pub. No.: WO2020/003899
PCT Pub. Date: Jan. 2, 2020

(65) Prior Publication Data
US 2021/0229182 A1    Jul. 29, 2021

(30) Foreign Application Priority Data
Jun. 27, 2018   (JP) .................................. 2018-122324

(51) Int. Cl.
*B22F 10/22* (2021.01)
*B22F 10/85* (2021.01)
(Continued)

(52) U.S. Cl.
CPC .............. *B22F 10/22* (2021.01); *B22F 10/85* (2021.01); *B23K 9/04* (2013.01); *B33Y 30/00* (2014.12); *B33Y 50/02* (2014.12)

(58) Field of Classification Search
CPC . B22F 10/22; B22F 10/85; B23K 9/04; B33Y 30/00; B33Y 50/02; B33Y 50/00
See application file for complete search history.

(56) References Cited

U.S. PATENT DOCUMENTS

| 2016/0236414 A1 | 8/2016 | Reese et al. |
| 2017/0120337 A1 | 5/2017 | Kanko et al. |

(Continued)

FOREIGN PATENT DOCUMENTS

| CN | 108637252 A | * 10/2018 | ............ B22F 3/1055 |
| JP | 2017-077671 A | 4/2017 | |

(Continued)

OTHER PUBLICATIONS

The extended European search report issued by the European Patent Office dated Mar. 9, 2022, which corresponds to European Patent Application No. 19824965.8-1016 and is related to U.S. Appl. No. 15/733,967.

(Continued)

Primary Examiner — Janie M Loeppke
Assistant Examiner — Theodore J Evangelista
(74) Attorney, Agent, or Firm — Studebaker & Brackett PC

(57) ABSTRACT

A method for manufacturing an additively-manufactured object in which deposition is performed by melting and solidifying a metal depending on three-dimensional shape data of a target shape, includes: acquiring the three-dimensional shape data; creating a deposition plan in which a formation track and a heating condition of the metal are determined; determining a difference between a shape of the (Continued)

additively-manufactured object that thermally contracts by cooling after deposition and a shape of the three-dimensional shape data by an operation; modifying the deposition plan until the difference falls within a predetermined allowable range; and additively manufacturing the additively-manufactured object based on the deposition plan in which the difference falls within the allowable range.

11 Claims, 10 Drawing Sheets

(51) Int. Cl.
    *B23K 9/04*     (2006.01)
    *B33Y 30/00*     (2015.01)
    *B33Y 50/02*     (2015.01)

(56) References Cited

U.S. PATENT DOCUMENTS

2017/0136703 A1    5/2017    Hayes et al.
2017/0337748 A1    11/2017    Takebe
2018/0029169 A1    2/2018    Arai et al.
2021/0039321 A1*    2/2021    Yorozu ................ G01B 11/24

FOREIGN PATENT DOCUMENTS

| | | | |
|---|---|---|---|
| JP | 2017077671 A | * | 4/2017 |
| JP | 2017-114114 A | | 6/2017 |
| JP | 2017-205975 A | | 11/2017 |
| JP | 2018-027558 A | | 2/2018 |
| JP | 2018027558 A | * | 2/2018 |
| JP | 2018-122324 A | | 8/2018 |
| WO | 2019/188894 A1 | | 10/2019 |

OTHER PUBLICATIONS

International Search Report issued in PCT/JP2019/021879; dated Jul. 30, 2019.
Written Opinion issued in PCT/JP2019/021879; dated Jul. 30, 2019.

* cited by examiner

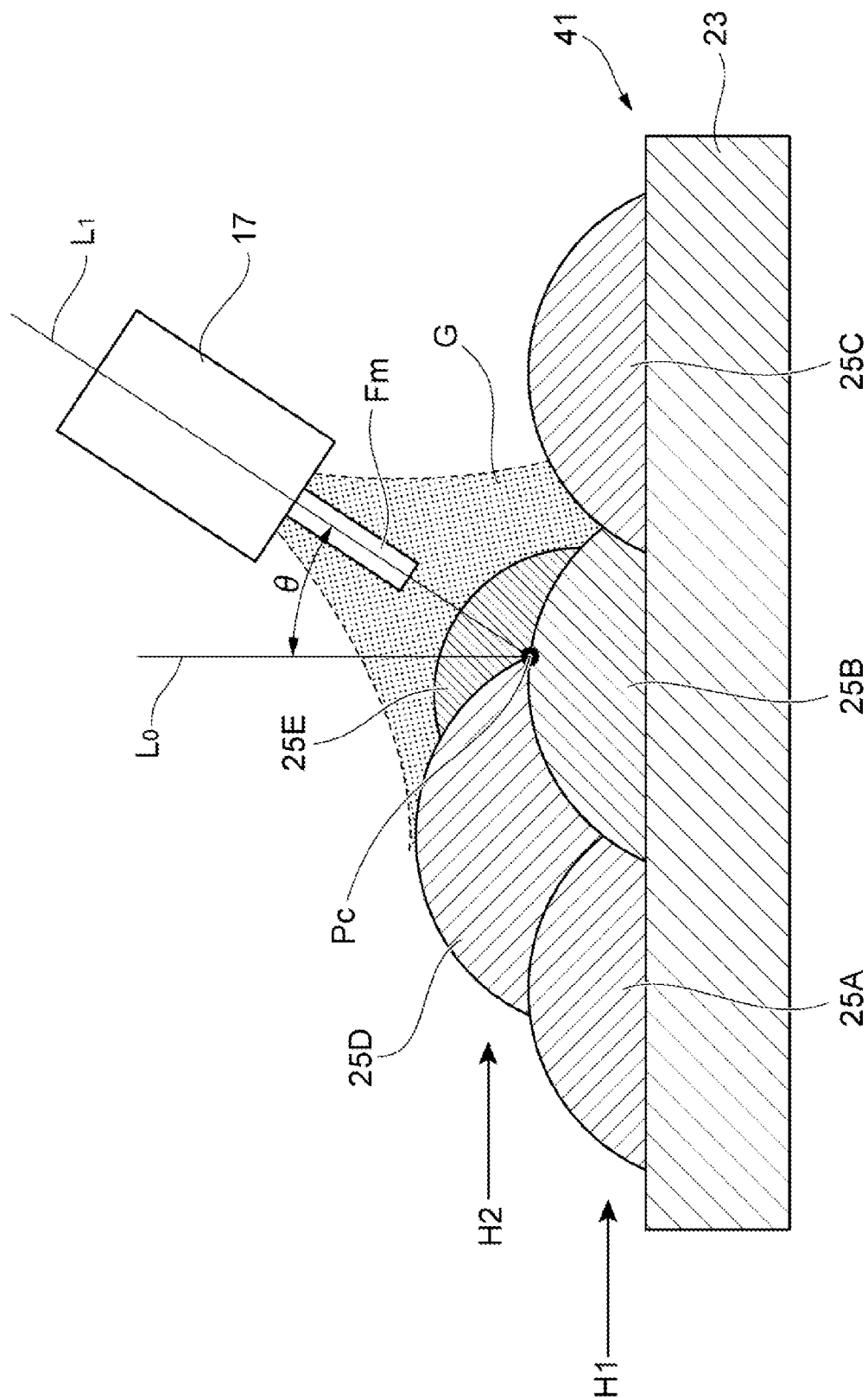

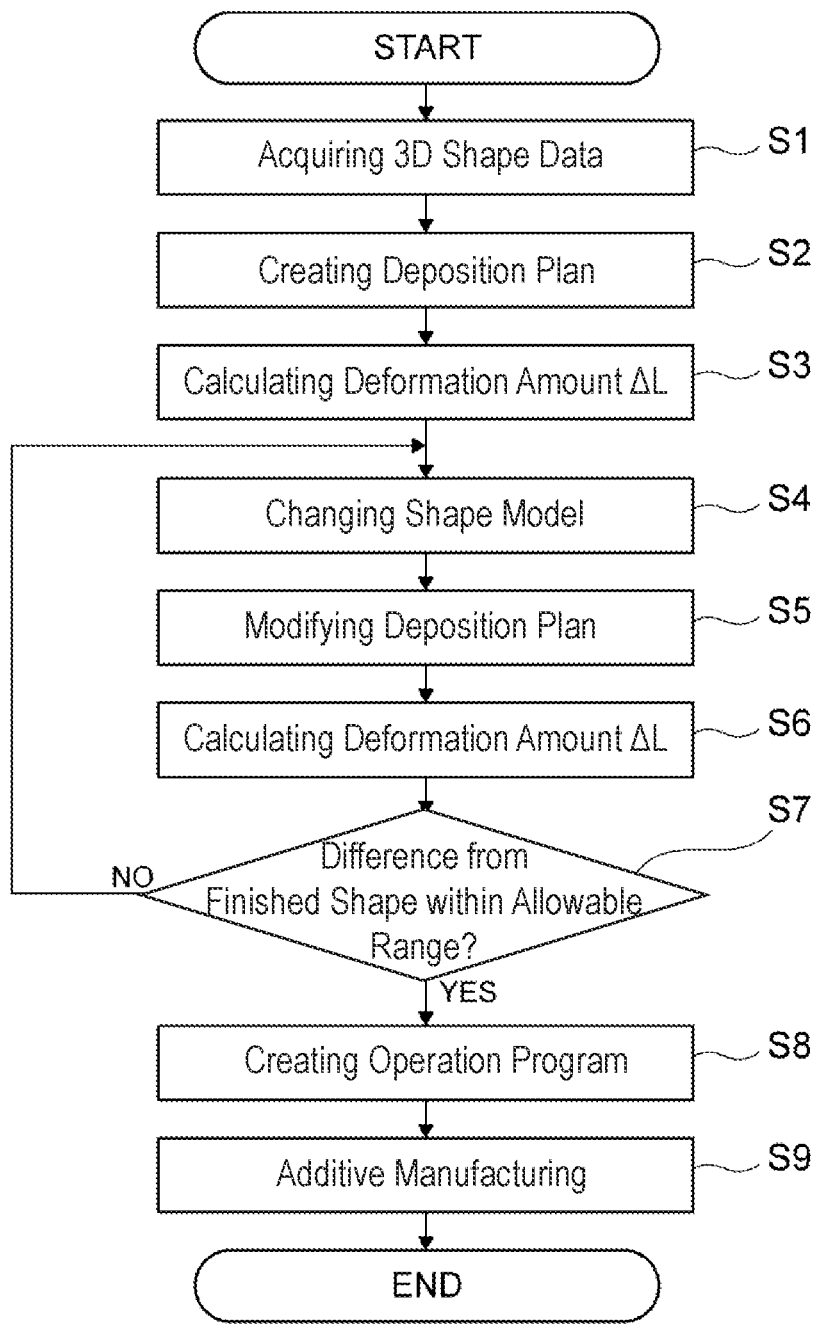

LAMINATED MOLDED OBJECT PRODUCTION METHOD AND PRODUCTION DEVICE

TECHNICAL FIELD

The present invention relates to a method and an apparatus for manufacturing an additively-manufactured object.

BACKGROUND ART

An additive manufacturing apparatus for manufacturing a three-dimensional built object is common. In such an additive manufacturing apparatus, three-dimensional shape data representing a target shape of the built object is input, and shape data of a sliced layer obtained by slicing the three-dimensional shape data into layers with a predetermined thickness is generated. Then, the additive manufacturing apparatus sequentially forms shapes corresponding to the shape data of the sliced layers and is deposited repeatedly, thereby building a three-dimensional additively-manufactured object.

In the case where a building system of the additive manufacturing apparatus is a system of sequentially depositing layers obtained by heating a building material to be melted and solidified, a final shape of the built object after building changes due to thermal contraction of the building material. Therefore, Patent Literature 1 discloses a method in which deformation is predicted from the shape of the built object after building, the three-dimensional shape data is modified so as to reduce the deformation, and the built object is built using the shape data after modification. In the method, shape data is modified such that deformation of the built object after building from a target shape determined by the original three-dimensional shape data is reduced, preferably the deformation is offset.

CITATION LIST

Patent Literature

Patent Literature 1: JP-A-2017-205975

SUMMARY OF INVENTION

Technical Problem

However, in the case where the building material is heated to melt and solidified, an amount of heat input to the building material changes depending on heating conditions during building, so that an amount of thermal contraction of the built object varies. In the technique of Patent Literature 1, since the three-dimensional shape data is modified only from geometric shape data, it is impossible to cancel an influence of variations in the heat input amount due to the heating conditions. As a result, deviation from the target shape still occurs in the built object after building due to a difference in the heating conditions.

Therefore, an object of the present invention is to provide a method and an apparatus for manufacturing an additively-manufactured object capable of setting a shape of a built object after building to a target shape with high accuracy even when thermal contraction depending on heating conditions during building occurs in the built object.

Solution to Problem

The present invention includes the following configurations.

(1) A method for manufacturing an additively-manufactured object in which deposition is performed by melting and solidifying a metal depending on three-dimensional shape data of a target shape, the method including:
  acquiring the three-dimensional shape data;
  creating a deposition plan in which a formation track in which each layer obtained by slicing a shape of the three-dimensional shape data is formed by the metal and a heating condition of the metal are determined;
  determining a difference between a shape of the additively-manufactured object that thermally contracts by cooling after deposition and a shape of the three-dimensional shape data by an operation in a case where the additively-manufactured object is built by the deposition plan;
  modifying the deposition plan by changing the formation track and the heating condition until the difference falls within a predetermined allowable range; and
  additively manufacturing the additively-manufactured object based on the deposition plan in which the difference falls within the allowable range.

(2) An apparatus for manufacturing an additively-manufactured object configured to perform deposition by melting and solidifying a metal depending on three-dimensional shape data of a target shape, the apparatus including:
  an input unit for acquiring the three-dimensional shape data;
  a deposition plan creation unit for creating a deposition plan in which a formation track in which each layer obtained by slicing a shape of the three-dimensional shape data is formed by the metal and a heating condition of the metal are determined;
  a deformation amount calculation unit for determining a difference between a shape of the additively-manufactured object that thermally contracts by cooling after deposition and a shape of the three-dimensional shape data by an operation in a case where the additively-manufactured object is built by the deposition plan; and
  a control unit for modifying the deposition plan by changing the formation track and the heating condition until the difference falls within a predetermined allowable range.

Advantageous Effects of Invention

In the present invention, a shape of a built object after building can be set to a target shape even when thermal contraction depending on processing conditions of building occurs in the built object.

BRIEF DESCRIPTION OF DRAWINGS

FIG. 3 is a step illustrative view showing a state in which the additively-manufactured object is built by a plurality of beads.

FIG. 4 is a flow chart showing a procedure of a deposition plan and a manufacturing method of the additively-manufactured object.

DESCRIPTION OF EMBODIMENTS

Hereinafter, embodiments of the present invention will be described in detail with reference to the drawings.

<Apparatus for Manufacturing Additively-Manufactured Object>

Figure 1:
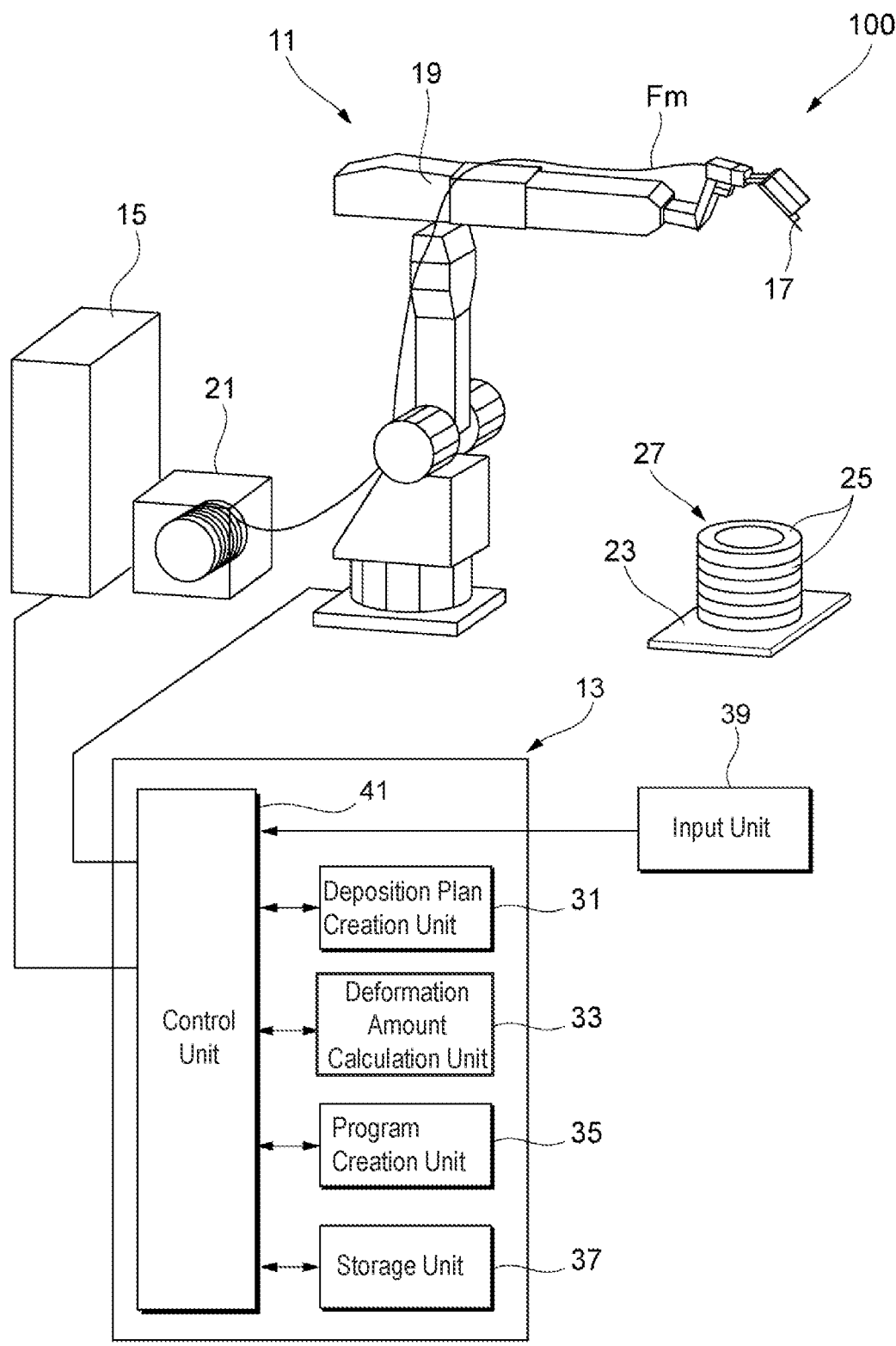
FIG. 1 is a schematic configuration diagram of an apparatus for manufacturing an additively-manufactured object in the present invention.

FIG. 1 is a schematic configuration diagram of an apparatus for manufacturing an additively-manufactured object according to the present invention.

A manufacturing apparatus 100 for the additively-manufactured object having the present configuration includes a building unit 11, a building controller 13 for collectively controlling the building unit 11, and a power supply unit 15.

The building unit 11 includes a welding robot 19 which is a torch moving mechanism including a torch 17 for arc welding provided on a tip shaft, and a filler metal feeding unit 21 for feeding a filler metal (welding wire) Fm to the torch 17.

The welding robot 19 is an articulated robot which has, for example, degrees of freedom on 6 axes, and in the torch 17 attached to the tip shaft of a robot arm, the filler metal Fm is supported such that it can be continuously fed. A position or posture of the torch 17 can be set three-dimensionally desirably within a range of the degree of freedom of the robot arm.

While holding the filler metal Fm, the torch 17 generates an arc from a tip end of the filler metal Fm in a shielding gas atmosphere. The torch 17 includes a shield nozzle (not shown), and shielding gas is fed from the shield nozzle. An arc welding method may be a consumable electrode type such as shielded metal arc welding or carbon dioxide gas arc welding or a non-consumable electrode type such as TIG welding or plasma arc welding, and is appropriately selected depending on an additively-manufactured object to be produced. For example, in the case of the consumable electrode type, a contact tip is disposed inside the shield nozzle, and the filler metal Fm to which a melting current is supplied is held on the contact tip.

Any commercially available welding wire can be used as the filler metal Fm. For example, MAG welding solid wires and MIG welding solid wires (JIS Z 3312) for mild steel, high tensile steel and cryogenic steel, and arc welding flux cored wires (JIS Z 3313) for mild steel, high tensile steel and cryogenic steel can be used.

The filler metal Fm is fed from the filler metal feeding unit 21 to the torch 17 by a drawing mechanism (not shown) attached to a robot arm or the like of the welding robot 19. Then, the torch 17 moves along a desired welding line by driving the robot arm in accordance with a command from the building controller 13. The continuously fed filler metal Fm is melted in a shielding gas atmosphere by an arc generated at the tip end of the torch 17, and solidified. As a result, a bead 25, which is a molten and solidified body of the filler metal Fm, is formed. As described above, the building unit 11 is an additive manufacturing apparatus configured to deposit a molten metal of the filler metal Fm, and is configured to deposit the beads 25 in a multilayer shape on a base material 23, thereby building the additively-manufactured object 27.

A heat source for melting the filler metal Fm is not limited to the above-described arc. The heat source using another system such as a heating system using an arc and a laser together, a heating system using plasma, or a heating system using an electron beam or a laser may be used. In the case of using an arc, beads can be easily formed regardless of a raw material and a structure while ensuring shielding properties. In the case of heating by an electron beam or a laser, a heating amount can be controlled more finely to keep each weld bead in a more proper state, thereby contributing to further improvement in quality of the additively-manufactured object.

The building controller 13 includes a deposition plan creation unit 31, a deformation amount calculation unit 33, a program creation unit 35, a storage unit 37, an input unit 39, and a control unit 41 to which these units are connected. Three-dimensional model data (such as CAD data) representing a shape of the additively-manufactured object to be produced and various kinds of instruction information are input from the input unit 39 to the control unit 41.

The manufacturing apparatus 100 for the additively-manufactured object having the present configuration generates a model for forming the bead by using the input three-dimensional shape data and creates a deposition plan such as a movement locus of the torch and welding conditions for the additively-manufactured object 27. A final shape of the additively-manufactured object 27 changes due to thermal contraction that occurs after deposition of the beads. Therefore, in the manufacturing apparatus 100 having the present configuration, a deposition plan is modified in a procedure described later in detail so that the final shape of the additively-manufactured object 27 coincides with the shape of the input three-dimensional shape data. The control unit 41 creates an operation program depending on the modified deposition plan, drives each unit in accordance with the operation program, and deposits and builds the additively-manufactured object 27 having a desired shape.

The deposition plan creation unit 31 slices a model having a shape of the input three-dimensional shape data into a plurality of layers depending on a height of the beads 25. Then, a deposition plan for determining a track (formation track) of the torch 17 for forming the bead 25 and heating conditions (including welding conditions for obtaining a bead width, a bead deposit height, and the like) for forming the bead 25 is created for each layer of the sliced model.

In the case where the additively-manufactured object 27 is built in accordance with the created deposition plan, the deformation amount calculation unit 33 analytically determines a deformation amount due to thermal contraction occurring in the additively-manufactured object 27, and determines a difference (dimensional difference) from the model shape of the three-dimensional shape data. The determined dimensional difference is reflected in the deposition plan, and the deposition plan is modified so that the dimensional difference is within an allowable range.

The program creation unit 35 drives each unit of the building unit 11 to set a building procedure of the additively-manufactured object, and creates an operation program for causing a computer to execute the procedure. The created operation program is stored in the storage unit 37.

The operation program is stored in the storage unit 37, and specifications of various drive units included in the building unit 11, material information of the filler metal Fm, and the like are also stored in the storage unit 37, and the stored information is referred to as appropriate when the operation program is created by the program creation unit 35, when the operation program is executed, and the like. The storage unit 37 includes a storage medium such as a memory or a hard disk. Various kinds of information can be input to and output from the storage unit 37.

The building controller 13 including the control unit 41 is a computer device including a CPU, a memory, an I/O interface, and the like. The building controller 13 has a function of reading data or a program stored in the storage unit 37 and executing data processing or the operation program, and a function of driving and controlling each unit of the building unit 11. The control unit 41 creates and executes the operation program based on an instruction due to operation, communication, or the like from the input unit 39.

When the control unit 41 executes the program, units such as the welding robot 19, the power supply unit 15, and the like are driven in accordance with a programmed predetermined procedure. The welding robot 19 moves the torch 17 along a track or a locus programmed by the command from the building controller 13, and melts the filler metal Fm by the arc at a predetermined timing to form the bead 25 at a desired position.

Operation units such as the deposition plan creation unit 31, the deformation amount calculation unit 33, and the program creation unit 35 are provided in the building controller 13, but the configuration is not limited thereto. Although not shown, for example, the operation unit described above may be provided to an external computer such as a server or a terminal disposed separately from the manufacturing apparatus 100 for the additively-manufactured object via a communication unit such as a network or a storage medium. By providing the operation unit described above in the external computer, a desired operation program can be created without the manufacturing apparatus 100 for the additively-manufactured object, and the work of creating the program does not become complicated. Further, by transferring the created operation program to the storage unit 37 of the building controller 13, the building unit 11 can be operated in the same manner as in the case where the operation program is created by the building controller 13.

<Procedure of Basic Additive Manufacturing>

Next, a procedure of additively manufacturing the additively-manufactured object 27 of an illustrated example shown as a simple model will be briefly described.

Figure 2A:
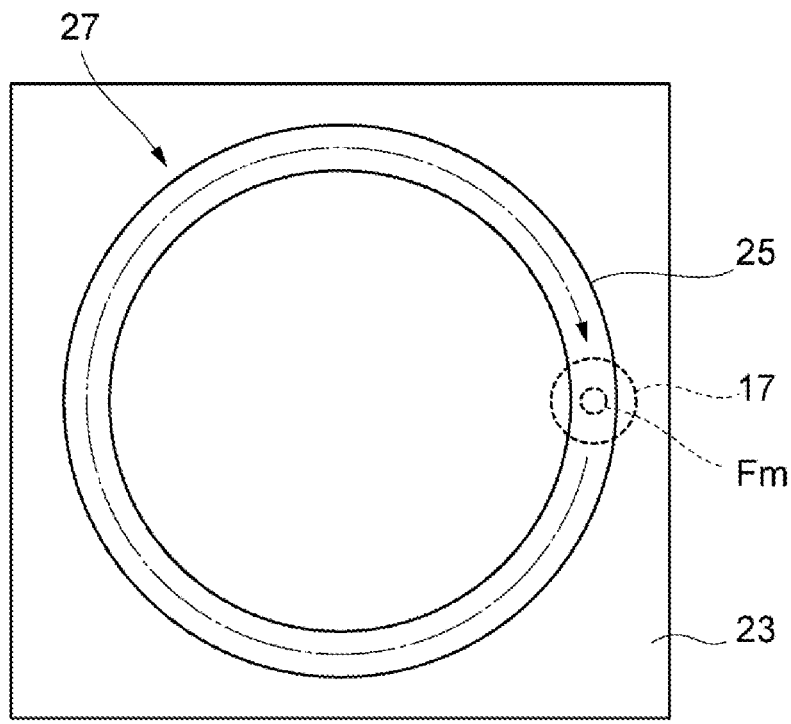
FIG. 2A is a plan view of the additively-manufactured object.
Figure 2B:
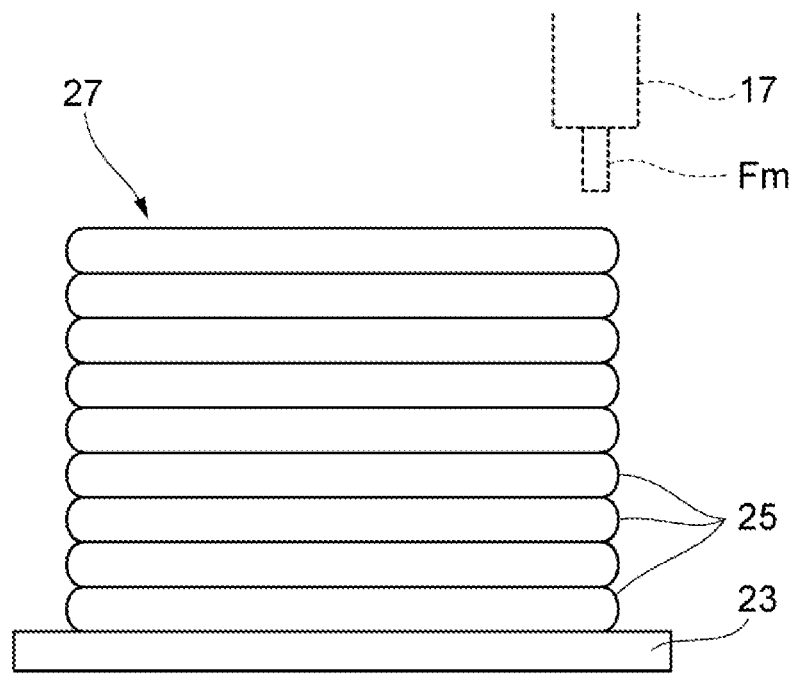
FIG. 2B is a side view of the additively-manufactured object.

FIG. 2A is a plan view of the additively-manufactured object 27, and FIG. 2B is a side view of the additively-manufactured object 27.

The additively-manufactured object 27 in the illustrated example has a cylindrical shape, and is built by sequentially depositing the beads 25 from a lower layer to an upper layer on the base material 23 installed in advance.

That is, the welding robot 19 shown in FIG. 1 moves the torch 17 along the instructed track in accordance with the operation program, and generates an arc together with the movement of the torch 17. As a result, the beads 25 are formed along the track on which the torch moves. The bead 25 is formed by melting and solidifying the filler metal Fm, and the next bead layer is repeatedly deposited on the formed bead layer.

Although FIG. 2A and FIG. 2B show an example in which one bead 25 forms one layer of the bead layer, it is also possible to form the bead layer with a plurality of beads.

FIG. 3 is a step illustrative view showing a state in which the additively-manufactured object is built by a plurality of beads.

In this case, the torch 17 is moved in a depth direction (direction perpendicular to paper) of FIG. 3, and the beads 25A, 25B, and 25C are formed adjacent to the base material 23 by the arc generated in a shielding gas G atmosphere. The beads 25A, 25B, and 25C of a first layer are formed by heating the vicinity of the target position of the bead formation by the generated arc, and solidifying the filler metal Fm molten by heating at the target position. In a second bead layer H2, a bead 25D is formed between the bead 25A and the bead 25B of the first bead layer H1, and a bead 25E is formed adjacent to the bead 25D. In this manner, the bead formation is repeated.

In this case, the torch 17 is inclined in a direction L1 which is inclined at a predetermined torch angle $\theta$ from a plate surface normal L0 of the base material 23. The torch angle $\theta$ can be a bisector of a tangent of two bead surfaces at a point Pc in the drawing.

In building of the additively-manufactured object, instead of forming the whole shape with the beads, a blank may be used as a part and the shape of the additively-manufactured object may be obtained by forming the beads on a surface of the blank. In this case, by using the input three-dimensional shape data, an outer shape of the additively-manufactured object is divided into a blank region serving as a base body of the additively-manufactured object, and an additive manufacturing region serving as the outer shape of the additively-manufactured object to be formed on the base body, to form the beads on the additive manufacturing region. According to this method, a building step can be reduced.

<Deposition Plan and Deposition Conditions of Additively-Manufactured Object>

Next, creation of the deposition plan of the additively-manufactured object 27 shown as an example in FIG. 2A and FIG. 2B and an additive manufacturing procedure will be described in detail.

FIG. 4 is a flow chart showing a procedure of a deposition plan and a manufacturing method of the additively-manufactured object. Hereinafter, each procedure will be sequentially described using the flowchart.

First, the building controller 13 shown in FIG. 1 acquires the three-dimensional shape data of the additively-manufactured object to be built from the input unit 39 (S1). Depending on a shape of the acquired three-dimensional shape data, the deposition plan creation unit 31 of the building controller 13 creates a deposition plan for forming the shape by the beads (S2). The deposition plan includes creating a track plan representing a track for moving the torch 17, and setting welding conditions such as a welding current, an arc voltage, a welding speed, and a torch angle in forming the beads using an arc as a heat source.

Figure 5:
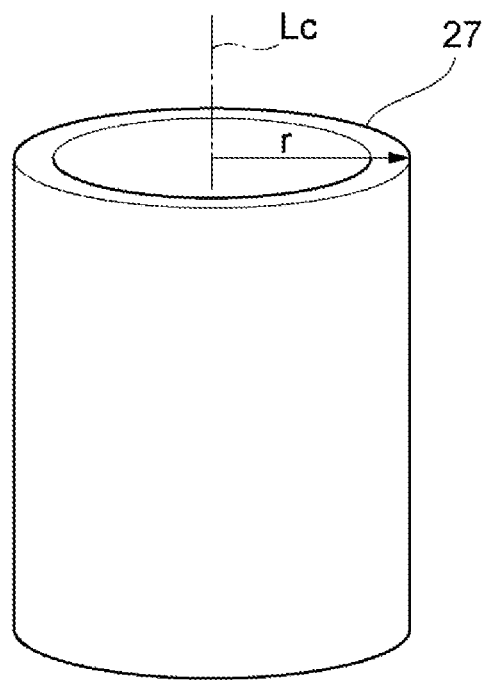
FIG. 5 is a perspective view showing a cylindrical additively-manufactured object.
Figure 6:
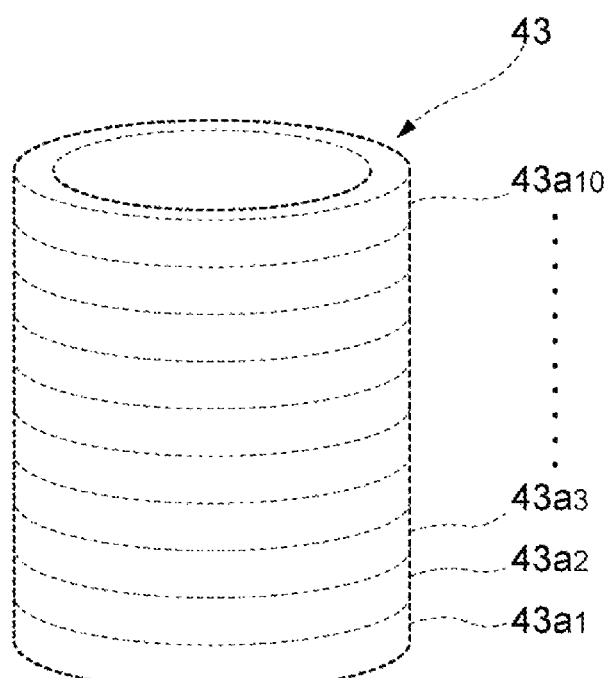
FIG. 6 is an illustrative view showing a shape model in a case of building the additively-manufactured object shown in FIG. 5.

Specifically, as shown in FIG. 5, in the case of building the cylindrical additively-manufactured object 27 formed to have a constant radius r from a central axis Lc, as shown in FIG. 6, the shape of the additively-manufactured object 27 is sliced into a plurality of layers (ten layers in the illustrated example) in a vertical direction, and a shape model 43 having a plurality of sliced layers $43_{a1}$, $43_{a2}$, $43_{a3}$, ..., and $43_{a10}$ is generated. Tracks for moving the torch 17 (see FIG. 1) are required corresponding to the models of the sliced layers $43_{a1}$, $43_{a2}$, $43_{a3}$, ..., and $43_{a10}$ respectively. The tracks are determined by an operation or the like based on a predetermined algorithm. In the case of the illustrated example, track information includes path information such as a space coordinate of a path for moving the torch 17, a path radius, or a path length, bead information such as a bead width or a bead height of a bead to be formed, and the like. A height of the sliced layer is determined depending on the bead height set by the welding conditions.

Next, the deformation amount calculation unit 33 shown in FIG. 1 analytically calculates a deformation amount due to thermal contraction that occurs in the additively-manufactured object when the created track plan is executed in the set welding conditions (S3). The deformation amount can be determined by using any one of thermo-elastic-plastic analysis, inherent strain method analysis, and thermoelastic analysis. For example, by selectively specifying any one of the above theories by analysis (FEM analysis) using a finite element method and analyzing, the final shape of the additively-manufactured object in a state cooled to room temperature after building can be estimated. The storage unit 37 stores physical property information and the like depending on the material of the filler metal Fm, and the information is appropriately used for analysis.

Figure 7:
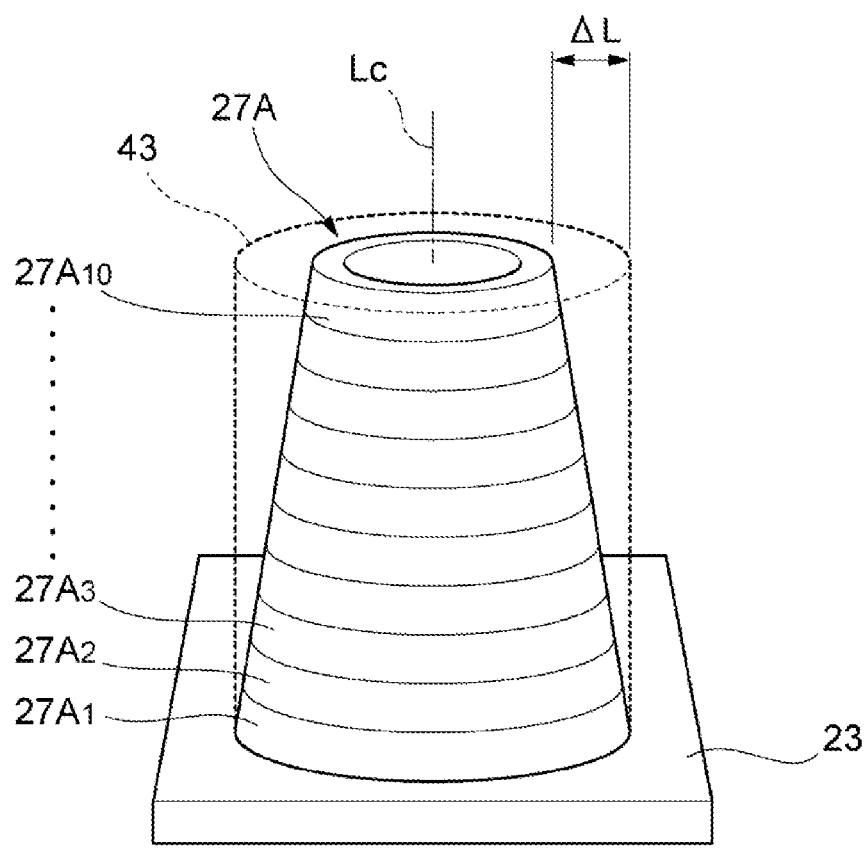
FIG. 7 is an illustrative view showing a state in which the additively-manufactured object is deformed by thermal contraction from a shape of the shape model.

FIG. 7 is an illustrative view showing a state in which the additively-manufactured object 27A is deformed by thermal contraction from a shape of the shape model 43.

The building unit 11 shown in FIG. 1 executes an operation program corresponding to the shape model 43, thereby forming the beads 25 in accordance with the shape of the shape model 43. After the beads 25 are deposited, the completed additively-manufactured object is cooled from a high temperature state due to heating to room temperature. Then, as shown in FIG. 7, the additively-manufactured object 27 is deformed into the final shape by thermal contraction. In the additively-manufactured object 27A of the illustrated example, a deformation amount is maximum in a final layer $27A_{10}$ farthest from the base material 23, and deformation of ΔL occurs in a radial direction from the shape of the shape model 43.

In this way, when the deposition plan is created and additive manufacturing is performed with the shape model 43 as a target shape, the completed additively-manufactured object is deformed into a shape different from the shape of the shape model 43 by thermal contraction. Therefore, in the manufacturing apparatus 100 for the additively-manufactured object having the present configuration, the deposition plan is modified so as to cancel deformation due to thermal contraction that occurs.

Figure 8:
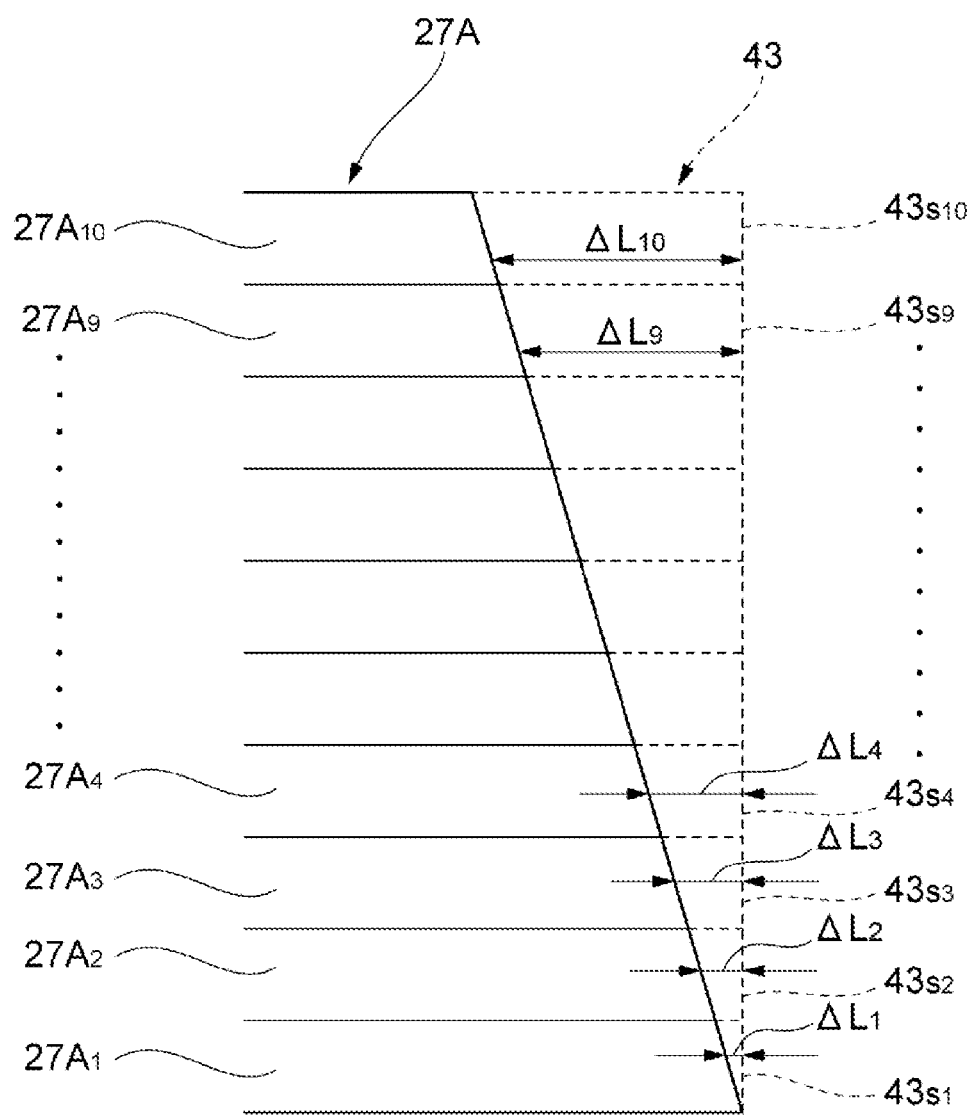
FIG. 8 is a schematic illustrative diagram showing a difference from the shape model of the additively-manufactured object deformed by thermal contraction.

FIG. 8 is a schematic illustrative diagram showing a difference from the shape model 43 of the additively-manufactured object 27A deformed by thermal contraction.

Here, the deformation amount ΔL in the radial direction centering on the central axis Lc of the additively-manufactured object 27A shown in FIG. 7 is shown as ΔLi (ΔL$_1$, ΔL$_2$, ΔL$_3$, ..., ΔL$_{10}$) corresponding to the sliced layers $43_{S1}$, $43_{S2}$, $43_{S3}$, ... $43_{S10}$ respectively of the shape model 43.

Next, the shape model set as the target shape is changed from the original shape model 43 to a modification shape model having a shape which considers the analytically determined deformation amount ΔLi (S4).

A modification shape model 45 is obtained by modifying the shape model 43 using the deformation amount ΔLi so that the shape of the additively-manufactured object after additive manufacturing and thermal contraction becomes the shape of the original shape model 43.

As a specific method of setting the modification shape model 45, various methods can be employed. Here, as an example, a method of adding the deformation amount ΔLi to the shape of the original shape model 43 in a direction opposite to the deformation direction will be described.

Figure 9:
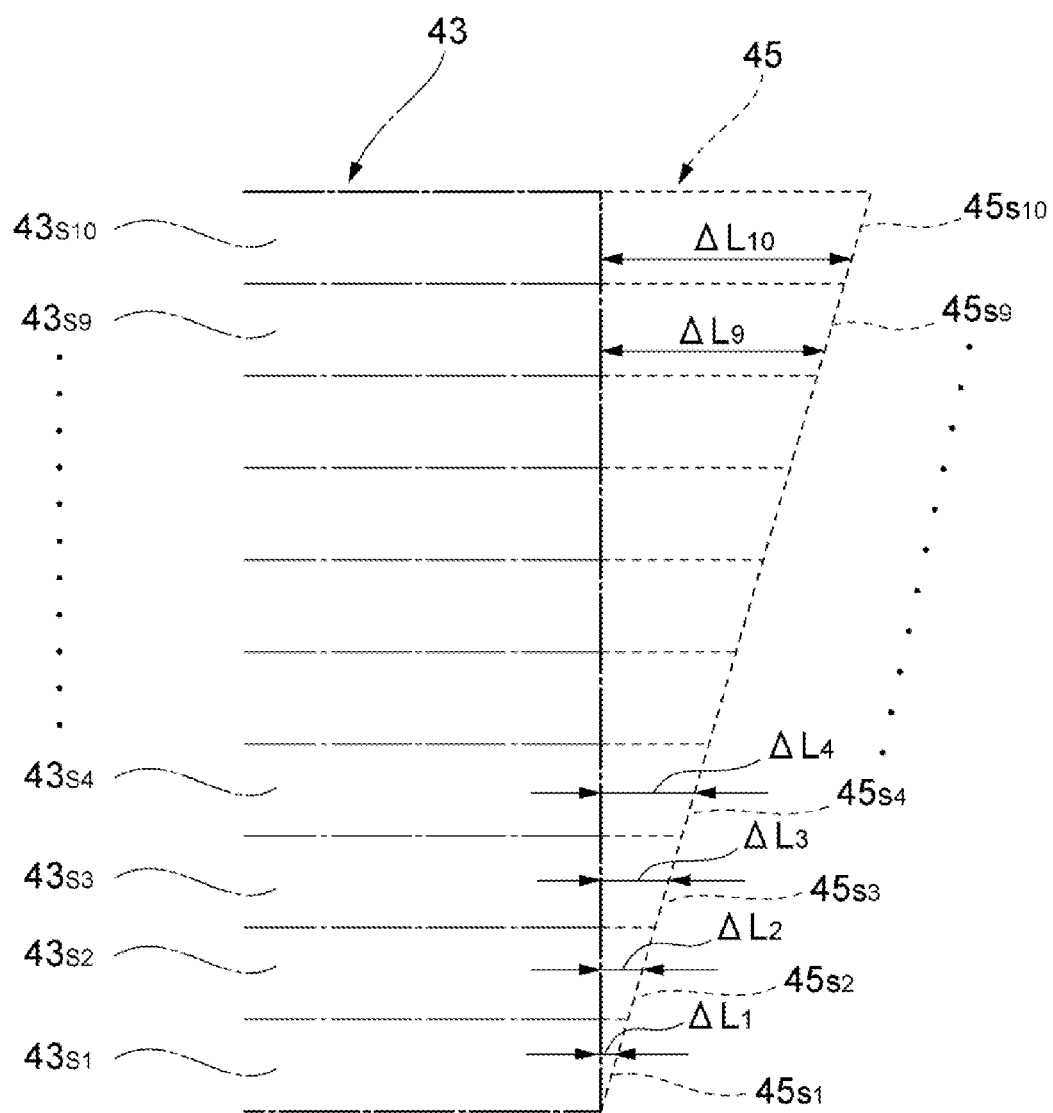
FIG. 9 is an illustrative diagram schematically showing a state in which the shape model is modified.

FIG. 9 is an illustrative diagram schematically showing a procedure of modifying the shape model 43.

The original shape model 43 (also see FIG. 6) has the sliced layers $43_{S1}$ to $43_{S10}$. Each of the sliced layers $43_{S1}$ to $43_{S10}$ has a shape that forms a part of a cylindrical body having the same diameter. The modification shape model 45 is obtained by modifying the model of each of the sliced layers $43_{S1}$ to $43_{S10}$ to extend by the deformation amount ΔLi in a direction (a direction toward a radially outer side) opposite to a deformation direction (a direction toward a radially inner side).

That is, at a position of the sliced layer $43_{S1}$, a sliced layer $45_{S1}$ of the modification shape model 45 is set as an expanded ring shape obtained by extending the sliced layer $43_{S1}$ radially outward by the deformation amount ΔLi. Similarly, sliced layers $45_{S2}$ to $45_{S10}$ of the modification shape model 45 are set as shapes obtained by extending the sliced layers $43_{S2}$ to $43_{S10}$ radially outward by corresponding deformation amounts ΔL$_2$ to ΔL$_{10}$.

Figure 10:
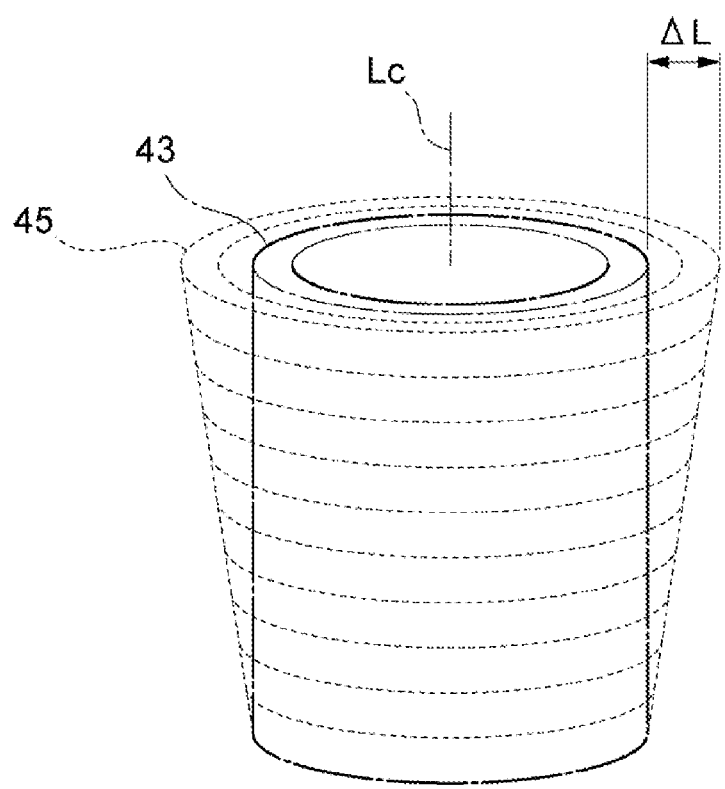
FIG. 10 is an illustrative view schematically showing a modification shape model in which the shape model is modified.

FIG. 10 is an illustrative view schematically showing the modification shape model 45 in which the shape model 43 is modified.

The modification shape model 45 obtained by modifying the shape of each of the sliced layers $43_{S1}$ to $43_{S10}$ (see FIG. 9) of the shape model 43 has a side shape of an inverted cone whose diameter is increased depending on the deformation amount ΔLi.

A deposition plan is created (modified) in the same manner as the step S2 shown in FIG. 4 by using the modification shape model 45 (S5). At this time, only the track plan may be modified, but the heating conditions may be reset as necessary. For example, various shape parameters such as a bead width and a bead height can be adjusted by increasing or decreasing the welding current and changing a heat input amount. In this case, an adjustable range can be increased, and an optimum deposition plan can be efficiently modified.

Then, the deformation amount ΔL generated in the case of additively manufacturing the modification shape model 45 based on the modified deposition plan is analytically determined in the same manner as the case of S3 described above (S6).

Figure 11:
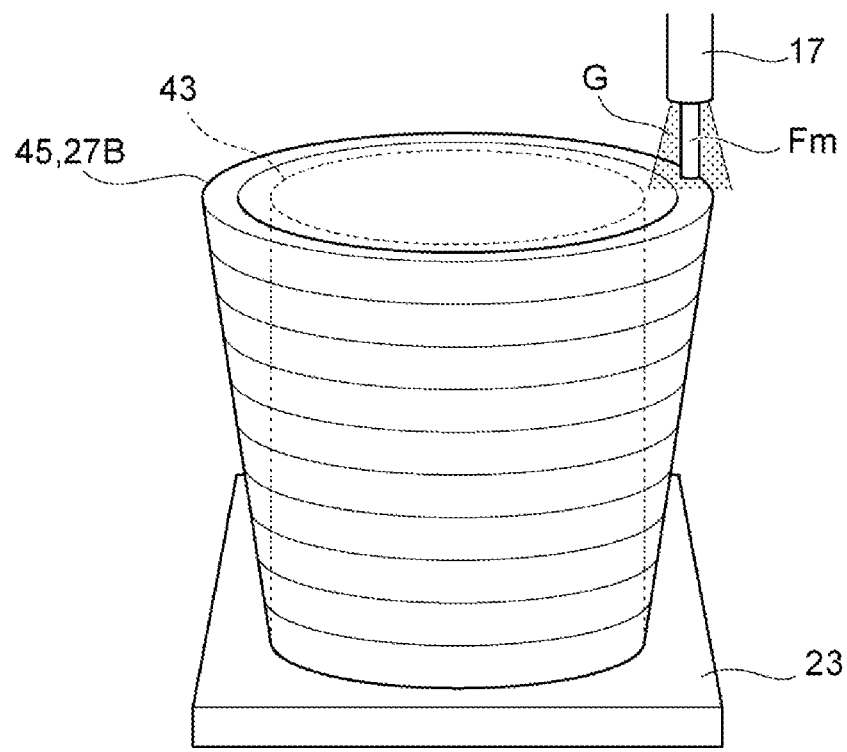
FIG. 11 is an illustrative view showing a state in which the additively-manufactured object is deposited and built using a torch.

According to the modification track plan for additively manufacturing the shape of the modification shape model 45 as a target shape, as shown in FIG. 11, an additively-manufactured object 27B along the shape of the modification shape model 45 is obtained immediately after additive manufacturing by the torch 17. When the additively-manufactured object 27B is cooled to room temperature, deformation due to thermal contraction occurs as shown in FIG. 12, and finally, a shape of an additively-manufactured object 27C is analytically obtained.

Figure 12:
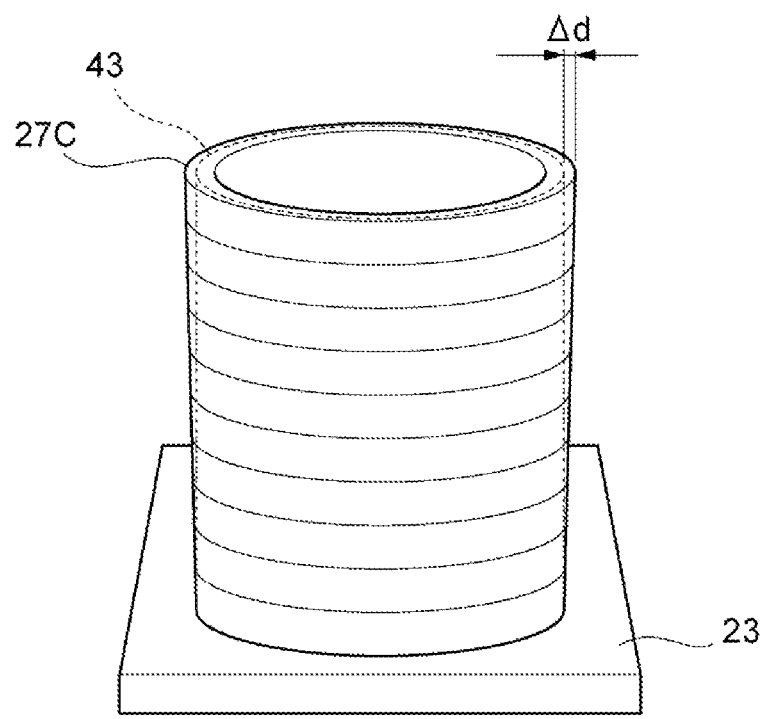
FIG. 12 is an illustrative view showing the additively-manufactured object after thermal contraction.

Here, a difference Ad between the shape of the additively-manufactured object 27C deformed by the analytically obtained deformation amount ΔLi shown in FIG. 12 and the first shape of the shape model 43 (the shape of the input three-dimensional shape data) is determined, and it is determined whether the difference Ad falls within a predetermined allowable range a (S7).

In the case where the difference Ad exceeds the allowable range s, the process returns to the step S4 described above, and a modification shape model 47 which is the target shape is changed again.

In the case where the modification shape model 47 is changed again, the deposition plan is created again by using the deformation amount ΔLi determined in the step S6. At this time, the heating conditions may be reset in addition to the track plan. Then, the deformation amount ΔLi generated in the additively-manufactured object when additive manufacturing is performed by the modified deposition plan is analytically determined. The difference Ad between the shape of the additively-manufactured object deformed by the determined deformation amount ΔLi and the first shape of the shape model 43 (the shape of the three-dimensional shape data) is determined, and the steps S4 to S7 are repeated until the difference Ad falls within the predetermined allowable range e.

In the case where the difference Ad falls within the allowable range s, the program creation unit 35 (see FIG. 1) creates an operation program indicating a procedure of forming beads based on the deposition plan (track plan, heating conditions) modified in the above S6 (S8).

The operation program referred to here is a command code for causing the building unit 11 shown in FIG. 1 to perform a bead forming procedure designed by a predetermined operation based on the input three-dimensional shape data of the additively-manufactured object. The control unit 41 causes the building unit 11 to manufacture the additively-manufactured object by executing the operation program stored in the storage unit 37. That is, the control unit 41 reads a desired operation program from the storage unit 37, moves the torch 17 shown in FIG. 1 by driving the welding robot 19 in accordance with the operation program, and generates an arc from the tip of the torch 17. As a result, the beads 25 are repeatedly formed on the base material 23, and an additively-manufactured object having the same shape as the shape model 43 can be built with high accuracy.

In the above example, the additively-manufactured object is formed into a simple cylindrical shape, but the shape of the additively-manufactured object is not limited thereto. The more complicated shape the additively-manufactured object, the more remarkable effects due to the deposition plan and the manufacturing method described above, and thus the additively-manufactured object can be suitably applied.

As described above, in the manufacturing apparatus 100 for the additively-manufactured object having the present configuration, since the deformation amount due to thermal contraction is analytically determined and the deposition plan is created without actually additively manufacturing the additively-manufactured object, creation time of the deposition plan can be shortened to manufacture an additively-manufactured object highly efficiently.

Further, in the present deposition plan method, by repeatedly calculating the deformation amount ΔL and comparing the shape with the shape model 43, it is possible to reliably adjust a shape difference of the two so that the shape difference is reduced without using a special algorithm.

Then, by calculating the deformation amount ΔL due to thermal contraction based on thermo-elastic-plastic analysis, deformation analysis considering plastic deformation is performed, and the deformation amount can be predicted with high accuracy. Further, by performing the deformation analysis based on inherent strain method analysis in which inherent strain for each deposition condition is used, analysis in a short time can be performed more conveniently. Further, by performing the deformation analysis based on the thermal elastic analysis, it is possible to predict the deformation simply in a short time by inputting estimated contraction strain. In addition, in the case of small-scale deformation in which deformation to reach a plastic region does not occur, an analysis step can be further simplified, and highly accurate analysis can be performed even with a low-cost hardware.

Although the difference between a finished shape of the additively-manufactured object and the shape of the shape data has been described as a dimensional difference in the above example, it may be determined whether the difference is within the allowable range by using, for example, a volume (or area) of an overlapping region when the finished shape of the additively-manufactured object and the shape of the shape data are superimposed. That is, a parameter for determining whether the difference is within the allowable range may be any parameter as long as a shape difference can be determined.

As described above, the present invention is not limited to the above-mentioned embodiment. A combination of configurations in the embodiment, and modifications and applications made by one skilled in the art based on description in the specification, and common art, are planned in the present invention and fall within the scope of protection sought.

For example, the present technique is suitably applicable not only to a case of manufacturing an additively-manufactured object by welding but also to, for example, a case of scanning a processing head facing a powder material and depositing layers obtained by selectively melting and solidifying the powder material to obtain a three-dimensionally built additively-manufactured object.

As described above, the present description discloses the following items.

(1) A method for manufacturing an additively-manufactured object in which deposition is performed by melting and solidifying a metal depending on three-dimensional shape data of a target shape, the method including:
    acquiring the three-dimensional shape data;
    creating a deposition plan in which a formation track in which each layer obtained by slicing a shape of the three-dimensional shape data is formed by the metal and a heating condition of the metal are determined;
    determining a difference between a shape of the additively-manufactured object that thermally contracts by cooling after deposition and a shape of the three-dimensional shape data by an operation in a case where the additively-manufactured object is built by the deposition plan;
    modifying the deposition plan by changing the formation track and the heating condition until the difference falls within a predetermined allowable range; and
    additively manufacturing the additively-manufactured object based on the deposition plan in which the difference falls within the allowable range.

In the method for manufacturing an additively-manufactured object, the deposition plan is created to include not only the formation track for deposition by melting and solidifying the metal depending on the target shape, but also the heating conditions for forming the molten metal, so that a thermal contraction amount depending on a heat input amount during building is accurately determined. As a result, the deformation amount to be generated in the additively-manufactured object can be accurately grasped, and it is possible to manufacture an additively-manufactured object having higher shape accuracy.

(2) The method for manufacturing an additively-manufactured object according to (1), in which in determining the difference by an operation, a deformation amount due to the thermal contraction is determined using any one of thermo-elastic-plastic analysis, inherent strain method analysis, and thermoelastic analysis.

In the method for manufacturing the additively-manufactured object, a highly accurate deformation amount can be predicted by thermo-elastic-plastic analysis, inherent strain method analysis, and thermoelastic analysis.

(3) The method for manufacturing an additively-manufactured object according to (1) or (2), in which modification of the deposition plan changes the formation track toward a direction opposite to a direction in which deformation due to the thermal contraction occurs.

In the method for manufacturing an additively-manufactured object, deformation to occur can be easily cancelled without requiring a complicated operation.

(4) The method for manufacturing an additively-manufactured object according to any one of (1) to (3), in which the additively-manufactured object is built by forming a bead layer by a plurality of beads obtained by melting and solidifying a filler metal and repeatedly depositing a bead layer of a next layer on the formed bead layer.

In the method for manufacturing an additively-manufactured object, it is possible to manufacture a high-strength additively-manufactured object formed by the beads by welding.

(5) The method for manufacturing an additively-manufactured object according to (4), in which the beads are formed by melting the filler metal by an arc generated from a torch supported by a tip of a robot arm of a multi-axis robot.

In the method for manufacturing an additively-manufactured object, an additively-manufactured object having a desired shape can be manufactured with a high degree of freedom.

(6) The method for manufacturing an additively-manufactured object according to (5), in which the heating condition includes at least one of a welding current, an arc voltage, a welding speed, and a torch angle for forming the beads.

In the method for manufacturing an additively-manufactured object, the heat amount input to the additively-manufactured object can be accurately grasped, and a thermal contraction amount to be generated can be accurately predicted. Accordingly, an additively-manufactured object having higher shape accuracy can be manufactured.

(7) An apparatus for manufacturing an additively-manufactured object configured to perform deposition by melting and solidifying a metal depending on three-dimensional shape data of a target shape, the apparatus including:

an input unit for acquiring the three-dimensional shape data;

a deposition plan creation unit for creating a deposition plan in which a formation track in which each layer obtained by slicing a shape of the three-dimensional shape data is formed by the metal and a heating condition of the metal are determined;

a deformation amount calculation unit for determining a difference between a shape of the additively-manufactured object that thermally contracts by cooling after deposition and a shape of the three-dimensional shape data by an operation in a case where the additively-manufactured object is built by the deposition plan; and a control unit for modifying the deposition plan by changing the formation track and the heating condition until the difference falls within a predetermined allowable range.

According to the apparatus for manufacturing an additively-manufactured object, he deposition plan is created to include not only the formation track for deposition by melting and solidifying the metal depending on the target shape, but also the heating conditions for forming the molten metal, so that a thermal contraction amount depending on a heat input amount during building is accurately determined. As a result, the deformation amount to be generated in the additively-manufactured object can be accurately grasped, and it is possible to manufacture an additively-manufactured object having higher shape accuracy.

The present application is based on Japanese Patent Application No. 2018-122324 filed on Jun. 27, 2018, the contents of which are cited as reference in the present application.

REFERENCE SIGNS LIST

11 building unit (additive manufacturing apparatus)
13 building controller
17 torch
19 welding robot
25, 25A, 25B, 25C, 25D, 25E bead
27, 27A, 27B additively-manufactured object
31 deposition plan creation unit
33 deformation amount calculation unit
35 program creation unit
39 input unit
41 control unit
43 shape model
45 modification shape model
100 apparatus for manufacturing additively-manufactured object

The invention claimed is:

1. A method for manufacturing an additively-manufactured object in which deposition is performed by melting and solidifying a metal depending on three-dimensional shape data of a target shape, the method comprising:

[S1] acquiring the three-dimensional shape data;

[S2] creating a deposition plan in which a formation track in which each layer obtained by slicing a shape of the three-dimensional shape data is formed by the metal and a heating condition of the metal are determined;

[S3] determining a difference between a shape of the additively-manufactured object that thermally contracts by cooling to a room temperature after deposition and a shape of the three-dimensional shape data by an operation in a case where the additively-manufactured object is built by the deposition plan;

[S4] determining a modification shape model having a shape which considers the difference so that the shape of the additively-manufactured object after additive manufacturing and thermal contraction becomes the shape of the three-dimensional shape data;

[S5] creating a modified deposition plan that defines a formation track in which each layer obtained by slicing the shape of the modification shape model and the heating condition;

[S6] determining a difference between a shape of the additively-manufactured object that thermally contracts by cooling after deposition and the shape of the three-dimensional shape data by an operation in a case where the additively-manufactured object is built by the modified deposition plan;

[S7] repeating the above steps [S4] through [S6] until the difference falls within a predetermined allowable range; and additively manufacturing the additively-manufactured object based on the modified deposition plan in which the difference falls within the allowable range.

2. The method for manufacturing an additively-manufactured object according to claim 1, wherein in determining the difference by an operation, a deformation amount due to the thermal contraction is determined using any one of thermo-elastic-plastic analysis, inherent strain method analysis, and thermoelastic analysis.

3. The method for manufacturing an additively-manufactured object according to claim 2, wherein modification of the deposition plan changes the formation track toward a direction opposite to a direction in which deformation due to the thermal contraction occurs.

4. The method for manufacturing an additively-manufactured object according to claim 3, wherein the additively-manufactured object is built by forming a bead layer by a plurality of beads obtained by melting and solidifying a filler metal and repeatedly depositing a bead layer of a next layer on the formed bead layer.

5. The method for manufacturing an additively-manufactured object according to claim 2, wherein the additively-manufactured object is built by forming a bead layer by a plurality of beads obtained by melting and solidifying a filler metal and repeatedly depositing a bead layer of a next layer on the formed bead layer.

6. The method for manufacturing an additively-manufactured object according to claim 1, wherein modification of the deposition plan changes the formation track toward a direction opposite to a direction in which deformation due to the thermal contraction occurs.

7. The method for manufacturing an additively-manufactured object according to claim 6, wherein the additively-manufactured object is built by forming a bead layer by a plurality of beads obtained by melting and solidifying a filler metal and repeatedly depositing a bead layer of a next layer on the formed bead layer.

8. The method for manufacturing an additively-manufactured object according to claim 1, wherein the additively-manufactured object is built by forming a bead layer by a plurality of beads obtained by melting and solidifying a filler metal and repeatedly depositing a bead layer of a next layer on the formed bead layer.

9. The method for manufacturing an additively-manufactured object according to claim 8, wherein the beads are formed by melting the filler metal by an arc generated from a torch supported by a tip of a robot arm of a multi-axis robot.

10. The method for manufacturing an additively-manufactured object according to claim 9, wherein the heating condition comprises at least one of a welding current, an arc voltage, a welding speed, and a torch angle for forming the beads.

11. An apparatus for manufacturing an additively-manufactured object configured to perform deposition by melting and solidifying a metal depending on three-dimensional shape data of a target shape, the apparatus comprising:

an input unit for acquiring the three-dimensional shape data;

a deposition plan creation unit for creating a deposition plan in which a formation track in which each layer obtained by slicing a shape of the three-dimensional shape data is formed by the metal and a heating condition of the metal are determined;

a deformation amount calculation unit for determining a difference between a shape of the additively-manufactured object that thermally contracts by cooling to a room temperature after deposition and a shape of the three-dimensional shape data by an operation in a case where the additively-manufactured object is built by the deposition plan; and a control unit for

[A] determining a modification shape model having a shape which considers the difference so that the shape of the additively-manufactured object after additive manufacturing and thermal contraction becomes the shape of the three-dimensional shape data;

[B] creating a modified deposition plan that defines a formation track in which each layer obtained by slicing the shape of the modification shape model and the heating condition;

[C] determining a difference between a shape of the additively-manufactured object that thermally contracts by cooling after deposition and the shape of the three-dimensional shape data by an operation in a case where the additively-manufactured object is built by the modified deposition plan; and

[D] repeating the above steps [A] through [C] until the difference falls within a predetermined allowable range.

* * * * *